US012808989B2

(12) United States Patent
Hakoshima

(10) Patent No.: US 12,808,989 B2
(45) Date of Patent: Nov. 24, 2026

(54) GAZE DETECTION DEVICE, GAZE DETECTION METHOD, AND STORAGE MEDIUM

(71) Applicant: JVCKENWOOD Corporation, Yokohama (JP)

(72) Inventor: Shuji Hakoshima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/228,837

(22) Filed: Jun. 5, 2025

(65) Prior Publication Data

US 2025/0298128 A1 Sep. 25, 2025

Related U.S. Application Data

(63) Continuation of application No. PCT/JP2023/029562, filed on Aug. 16, 2023.

(30) Foreign Application Priority Data

Dec. 23, 2022 (JP) ................................ 2022-206874

(51) Int. Cl.

*G01S 7/48* (2006.01)
*G01S 17/89* (2020.01)
*G06F 3/01* (2006.01)

(52) U.S. Cl.

CPC ............ *G01S 7/4808* (2013.01); *G01S 17/89* (2013.01); *G06F 3/013* (2013.01)

(58) Field of Classification Search

CPC ....... G06F 3/0346; G06F 3/013; A61B 3/107; A61B 3/113; G01S 7/4808; G01S 17/89

See application file for complete search history.

(56) References Cited

U.S. PATENT DOCUMENTS

2007/0279590 A1* 12/2007 Ebisawa ................ A61B 3/113 351/208
2016/0262614 A1* 9/2016 Ninomiya .............. A61B 3/113

FOREIGN PATENT DOCUMENTS

| | | |
|---|---|---|
| EP | 4183322 | 5/2023 |
| JP | 2007-136000 | 6/2007 |
| WO | 2022/038814 | 2/2022 |

OTHER PUBLICATIONS

International Search Report and Written Opinion for International Application Serial No. PCT/JP2023/029562 mailed Sep. 19, 2023, 9 pages.

* cited by examiner

*Primary Examiner* — Shaheda A Abdin

(74) *Attorney, Agent, or Firm* — Amin, Turocy & Watson, LLP

(57) ABSTRACT

A gaze detection device includes a light source to irradiate an eyeball of a subject with detection light, an imaging unit to capture an image of the eyeball irradiated with the detection light, a position detection unit to detect, from the captured image, a position of a pupil center and a position of a corneal reflection center, a corneal curvature radius derivation unit to derive, based on a curvature radius table indicating a relationship between a position on a cornea and a corneal curvature radius, the corneal curvature radius corresponding to the detected position of the corneal reflection center, and a gaze processing unit to calculate a gaze of the subject by using the detected position of the corneal reflection center and the derived corneal curvature radius, in which the gaze processing unit calculates a straight line connecting the light source to the corneal reflection center, calculate, as a corneal curvature center, a position separated from the corneal reflection center by a distance corresponding to the corneal curvature radius derived by the corneal (Continued)

curvature radius derivation unit in a direction opposite to the light source on the calculated straight line, and calculate a gaze vector connecting the corneal curvature center to the pupil center as the gaze.

4 Claims, 13 Drawing Sheets

$$\begin{cases} \theta 1 = \frac{1}{2} \cdot arctan(a/x) \\ \theta 2 = \frac{1}{2} \cdot arctan\left(b/x\right) \\ d = r \cdot sin\theta 1 + r \cdot sin\theta 2 \end{cases}$$

GAZE DETECTION DEVICE, GAZE DETECTION METHOD, AND STORAGE MEDIUM

CROSS-REFERENCE TO RELATED APPLICATIONS

This application is a Continuation of PCT International Application No. PCT/JP2023/029562 filed on Aug. 16, 2023 which claims the benefit of priority from Japanese Patent Application No. 2022-206874, filed on Dec. 23, 2022, the entire contents of both of which are incorporated herein by reference.

BACKGROUND OF THE INVENTION

1. Field of the Invention

The present disclosure relates to a gaze detection device, a gaze detection method, and a gaze detection program.

2. Description of the Related Art

There is known a gaze detection device that emits detection light by a light source to irradiate an eyeball of a subject with the detection light, acquires an image of the eyeball irradiated with the detection light, calculates a pupil center and a corneal curvature center based on an image of a pupil and a reflected image of the detection light in the acquired image, and detects a vector from the corneal curvature center to the pupil center as a gaze direction of the subject (refer to, for example, JP 4649319 B2).

In the gaze detection device as described above, the corneal curvature center is calculated on the assumption that the corneal shape of the subject is equivalent to a part of the sphere. However, since an actual corneal shape is not a part of the sphere but a complicated shape, there is a possibility that detection accuracy of the gaze deteriorates in gaze detection using a corneal curvature radius.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A gaze detection device according to the present disclosure comprising: a light source configured to emit detection light to irradiate at least one eyeball of a subject with the detection light; an imaging unit configured to capture an image of the eyeball irradiated with the detection light; a position detection unit configured to detect, from the captured image, a position of a pupil center indicating a center of a pupil of the eyeball irradiated with the detection light and a position of a corneal reflection center indicating a center of corneal reflection; a corneal curvature radius derivation unit configured to derive, based on a curvature radius table indicating a relationship between a position on a cornea and a corneal curvature radius, the corneal curvature radius corresponding to the detected position of the corneal reflection center; and a gaze processing unit configured to calculate a gaze of the subject by using the detected position of the corneal reflection center and the derived corneal curvature radius, wherein the gaze processing unit is configured to: calculate a straight line connecting the light source to the corneal reflection center, calculate, as a corneal curvature center, a position separated from the corneal reflection center by a distance corresponding to the corneal curvature radius derived by the corneal curvature radius derivation unit in a direction opposite to the light source on the calculated straight line, and calculate, as the gaze, a gaze vector connecting the corneal curvature center to the pupil center.

A gaze detection method according to the present disclosure comprising: emitting detection light from a light source to irradiate at least one eyeball of a subject with the detection light; capturing an image of the eyeball irradiated with the detection light; detecting, from the captured image, a position of a pupil center indicating a center of a pupil of the eyeball irradiated with the detection light and a position of a corneal reflection center indicating a center of corneal reflection;

deriving, based on a curvature radius table indicating a relationship between a position on a cornea and a corneal curvature radius, the corneal curvature radius corresponding to the detected position of the corneal reflection center; and calculating a gaze of the subject by using the detected position of the corneal reflection center and the derived corneal curvature radius, wherein the calculation of the gaze comprises: calculating a straight line connecting the light source to the corneal reflection center, calculating, as a corneal curvature center, a position separated from the corneal reflection center by a distance corresponding to the corneal curvature radius in a direction opposite to the light source on the calculated straight line, and calculating, as the gaze, a gaze vector connecting the corneal curvature center to the pupil center.

A non-transitory computer-readable storage medium storing a program causing a computer according to the present disclosure to execute: processing of emitting detection light from a light source to irradiate at least one eyeball of a subject with the detection light; processing of capturing an image of the eyeball irradiated with the detection light; processing of detecting, from the captured image, a position of a pupil center indicating a center of a pupil of the eyeball irradiated with the detection light and a position of a corneal reflection center indicating a center of corneal reflection; processing of deriving, based on a curvature radius table indicating a relationship between a position on a cornea and a corneal curvature radius, the corneal curvature radius corresponding to the detected position of the corneal reflection center; and processing of calculating a gaze of the subject by using the detected position of the corneal reflection center and the derived corneal curvature radius, wherein, in the processing of calculating the gaze, the computer executes: processing of calculating a straight line connecting the light source to the corneal reflection center, processing of calculating, as a corneal curvature center, a position separated from the corneal reflection center by a distance corresponding to the corneal curvature radius in a direction opposite to the light source on the calculated straight line, and processing of calculating, as the gaze, a gaze vector connecting the corneal curvature center to the pupil center.

DETAILED DESCRIPTION OF THE PREFERRED EMBODIMENTS

Hereinafter, embodiments of a gaze detection device, a gaze detection method, and a gaze detection program according to the present disclosure will be described with reference to the drawings. It is noted that the present invention is not limited by the embodiment. In addition, configuration elements in the following embodiments include those that can be easily replaced by those skilled in the art or those that are substantially the same.

In the following description, a three-dimensional global coordinate system is set, and a positional relationship of each unit will be described. A direction parallel to a first axis of a predetermined plane is defined as an X-axis direction, a direction parallel to a second axis of the predetermined plane, which is orthogonal to the first axis, is defined as a Y-axis direction, and a direction parallel to a third axis orthogonal to each of the first axis and the second axis is defined as a Z-axis direction. The predetermined plane includes an XY plane.

Gaze Detection Device

Figure 1:
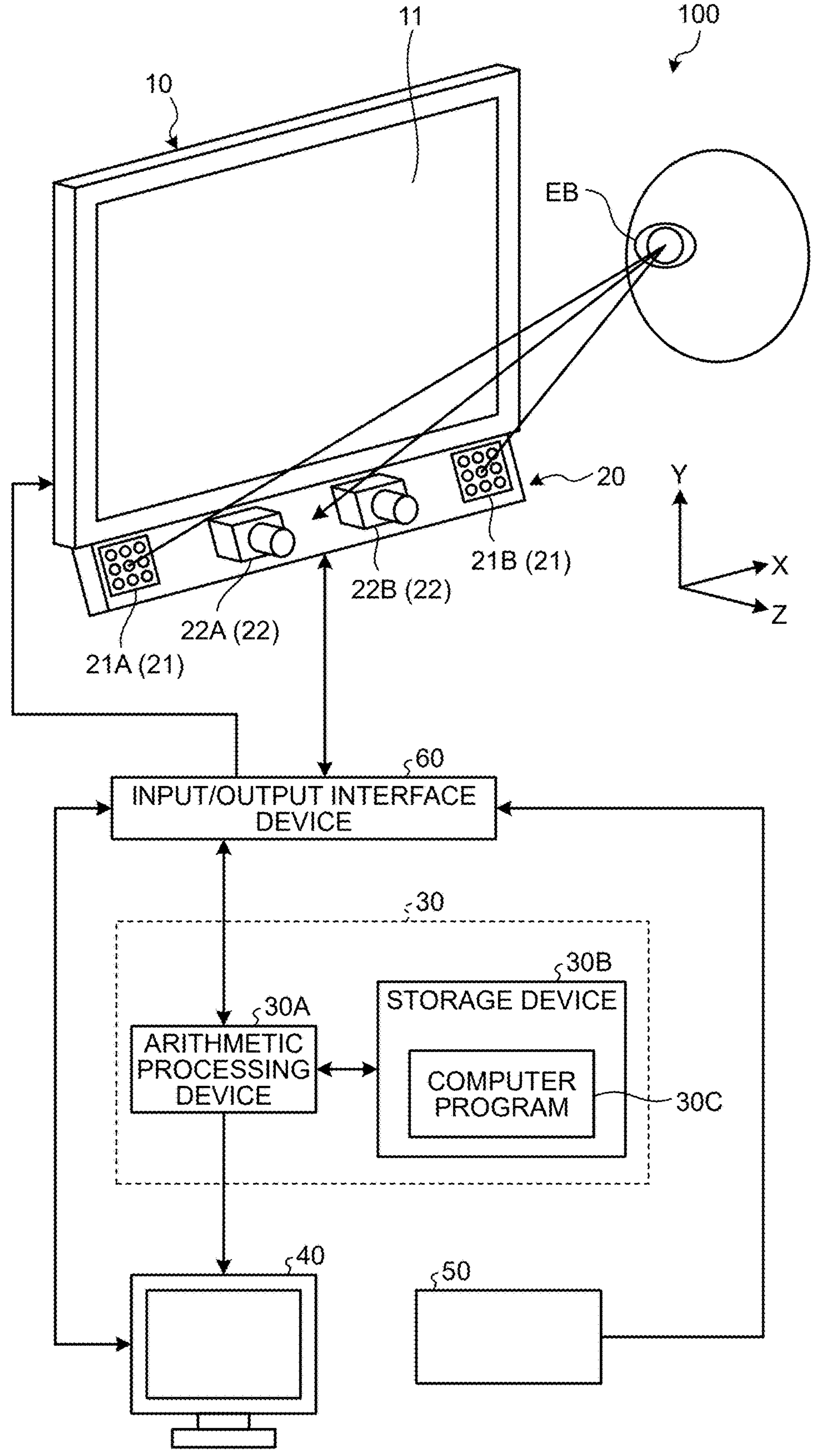
FIG. 1 is a diagram schematically illustrating an example of a gaze detection device according to the present embodiment.

FIG. 1 is a diagram schematically illustrating an example of a gaze detection device 100 according to the present embodiment. The gaze detection device 100 according to the present embodiment detects a gaze of the subject and outputs a detection result. The gaze detection device 100 detects the gaze based on, for example, the position of the pupil of the subject and the position of a corneal reflection image.

As illustrated in FIG. 1, the gaze detection device 100 includes a display device 10, an image acquisition device 20, a computer system 30, an output device 40, an input device 50, and an input/output interface device 60. The display device 10, the image acquisition device 20, the computer system 30, the output device 40, and the input device 50 perform data communication via the input/output interface device 60. Each of the display device 10 and the image acquisition device 20 includes a drive circuit (not illustrated).

The display device 10 includes a flat panel display such as a liquid crystal display (LCD) or an organic electroluminescence display (OLED). In the present embodiment, the display device 10 includes a display unit 11. The display unit 11 displays information such as an image. The display unit 11 is substantially parallel to the XY plane. The X-axis direction is a horizontal direction of the display unit 11, the Y-axis direction is a vertical direction of the display unit 11, and the Z-axis direction is a depth direction orthogonal to the display unit 11. The display device 10 may be a head-mounted display device. In the case of a head-mounted display, a configuration like the image acquisition device 20 is arranged in a head-mounted module.

The image acquisition device 20 acquires image data of the right and left eyeballs EB of a subject, and transmits the acquired image data to the computer system 30. The image acquisition device 20 includes a light source unit (light source) 21 and an imaging unit 22.

The light source unit 21 emits detection light to the eyeball EB of the subject. The light source unit 21 includes a first light source 21A and a second light source 21B arranged at different positions. The first light source 21A and the second light source 21B include a light emitting diode (LED) light source, and can emit, for example, near-infrared light having a wavelength of 850 [nm]. The light source unit 21 emits detection light in synchronization with a frame synchronization signal of the imaging unit 22. The light source unit 21 may include a single light source.

The imaging unit 22 generates image data by imaging the right and left eyeballs EB of the subject. The imaging unit 22 includes various cameras according to a method of detecting a gaze of the subject. In the case of a method of detecting the gaze based on the position of the pupil of the subject and the position of a corneal reflection image as in the present embodiment, the imaging unit 22 includes an infrared camera, and includes, for example, an optical system capable of transmitting near-infrared light having a wavelength of 850 [nm] and an imaging element capable of receiving the near-infrared light. The imaging unit 22 outputs a frame synchronization signal. The cycle of the frame synchronization signal can be, for example, 20 [msec], but is not limited thereto. The imaging unit 22 has a configuration of a stereo camera including a first camera 22A and a second camera 22B. The first camera 22A and the second camera 22B are arranged at different imaging positions. Image data acquired by the first camera 22A and the second camera 22B has a configuration in which pixels having luminance set by, for example, an 8-bit value (0 to 255) are two-dimensionally arranged. The smaller the value, the darker the luminance, and the larger the value, the brighter the luminance. A pixel having a luminance value of 0 is displayed as black in the image data. A pixel having a luminance value of 255 is displayed as white in the image data. The first camera 22A and the second camera 22B have, for example, the same resolution. In this case, the numbers of vertical and horizontal pixels of the image data acquired by the first camera 22A and the second camera 22B are equal to each other. The imaging unit 22 may include a single camera.

The computer system 30 integrally controls the operation of the gaze detection device 100. The computer system 30 includes an arithmetic processing device 30A and a storage device 30B. The arithmetic processing device 30A includes a microprocessor such as a central processing unit (CPU). The storage device 30B includes a memory or a storage such as a read only memory (ROM) and a random access memory (RAM). The arithmetic processing device 30A performs arithmetic processing according to a computer program 30C stored in the storage device 30B.

The output device 40 includes a display device such as a flat panel display. It is noted that the output device 40 may include a printing device. The input device 50 generates input data by being operated. The input device 50 includes a keyboard or a mouse for a computer system. It is noted that the input device 50 may include a touch sensor provided on a display unit of the output device 40 which is a display device.

In the gaze detection device 100 according to the present embodiment, the display device 10 and the computer system 30 are separate devices. It is noted that the display device 10 and the computer system 30 may be formed to be integrated with each other. For example, the gaze detection device 100 may include a tablet personal computer. In this case, a display device, an image acquisition device, a computer system, an input device, an output device, and the like may be mounted on the tablet personal computer.

Figure 2:
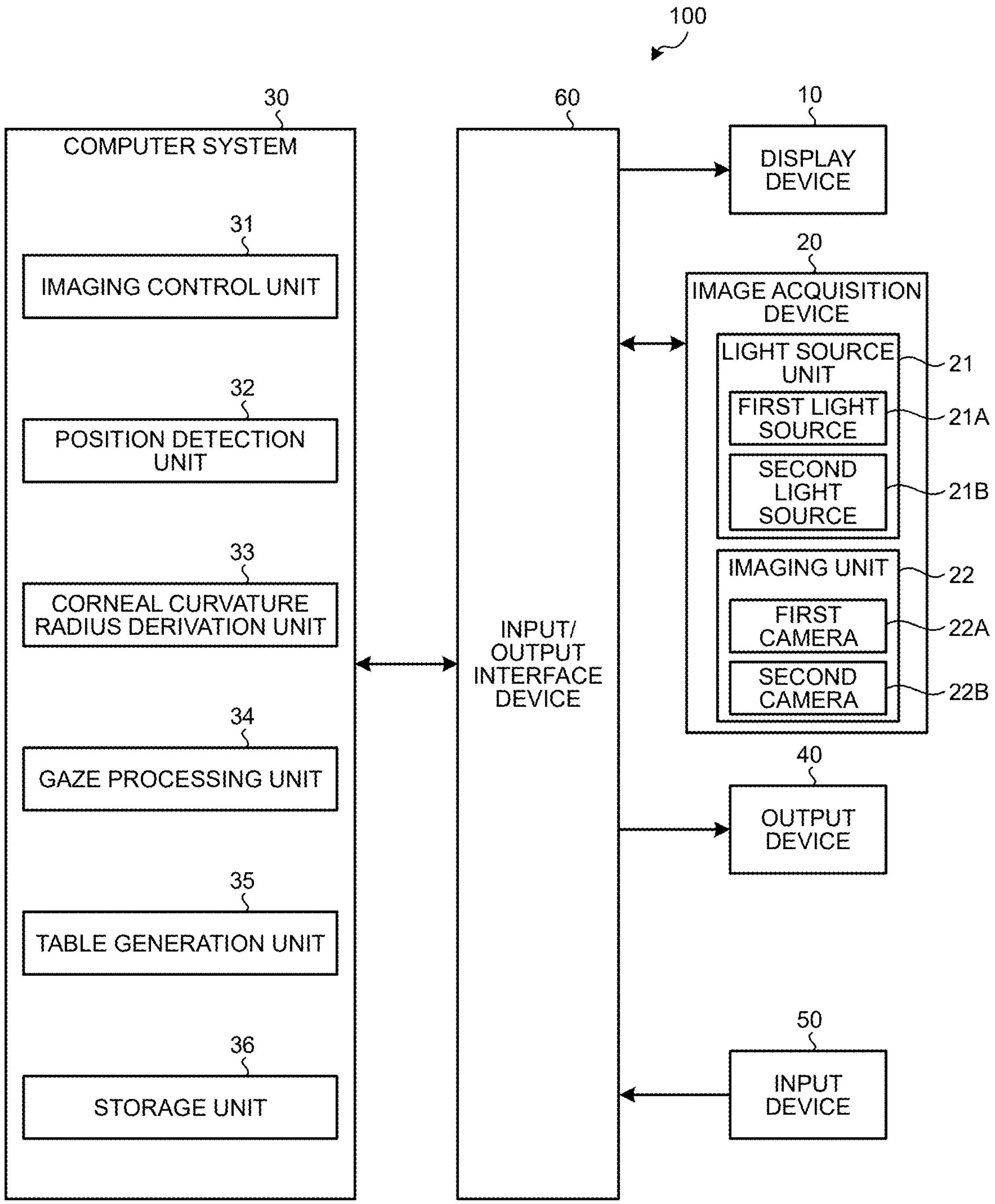
FIG. 2 is a functional block diagram illustrating an example of the gaze detection device.

FIG. 2 is a functional block diagram illustrating an example of the gaze detection device 100. As illustrated in FIG. 2, the computer system 30 includes an imaging control unit 31, a position detection unit 32, a corneal curvature radius derivation unit 33, a gaze processing unit 34, a table generation unit 35, and a storage unit 36. The functions of the computer system 30 are exerted by the arithmetic processing device 30A and the storage device 30B (refer to FIG. 1). It is noted that some functions of the computer system 30 may be provided outside the gaze detection device 100.

The imaging control unit 31 controls the light source unit 21 and the imaging unit 22. The imaging control unit 31 controls an emission timing, an emission time, and the like of the detection light for each of the first light source 21A and the second light source 21B of the light source unit 21. The imaging control unit 31 controls an imaging timing and the like of the first camera 22A and the second camera 22B of the imaging unit 22. The imaging control unit 31 causes the first light source 21A and the second light source 21B to emit the detection light in synchronization with a frame synchronization signal of the imaging unit 22. In the present embodiment, the imaging control unit 31 causes the first light source 21A and the second light source 21B to alternately emit the detection light, for example, at each cycle of the frame synchronization signal. The imaging control unit 31 acquires image data acquired by the image acquisition device 20. The imaging control unit 31 stores the acquired image data in the storage unit 36.

The position detection unit 32 detects position data of the pupil center indicating the center of the pupil of the eyeball of the subject, which is irradiated with the detection light, based on the image data of the eyeball of the subject, which is imaged by the imaging unit 22. In addition, the position detection unit 32 detects the position data of the corneal reflection center indicating the center of corneal reflection of the eyeball of the subject, which is irradiated with the detection light, based on the image data of the eyeball of the subject, which is imaged by the imaging unit 22. The position detection unit 32 detects the position data of the pupil center and the position data of the corneal reflection center for each of the right and left eyeballs of the subject. The position detection unit 32 calculates the position of the corneal reflection center by the detection light from the light source unit 21 based on the image data of the eyeball of the subject, which is imaged by the imaging unit 22. The corneal reflection center is the center of a corneal reflection image by each detection light. Furthermore, the position detection unit 32 detects a distance (hereinafter, referred to as a camera-to-subject distance) between the subject and the imaging unit 22 by a triangulation method based on the image data captured by two cameras of the first camera 22A and the second camera 22B of the imaging unit 22. The position detection unit 32 stores the detected pupil center, the position of the corneal reflection center, and the camera-to-subject distance in the storage unit 36.

The corneal curvature radius derivation unit 33 derives the corneal curvature radius corresponding to the detected position of the corneal reflection center based on a curvature radius table indicating a relationship between the position on the cornea of the eyeball of the subject and the corneal curvature radius. The curvature radius table is stored in, for example, the storage unit 36. The curvature radius table may be generated in advance or may be generated by the table generation unit 35 to be described later.

Figure 3:
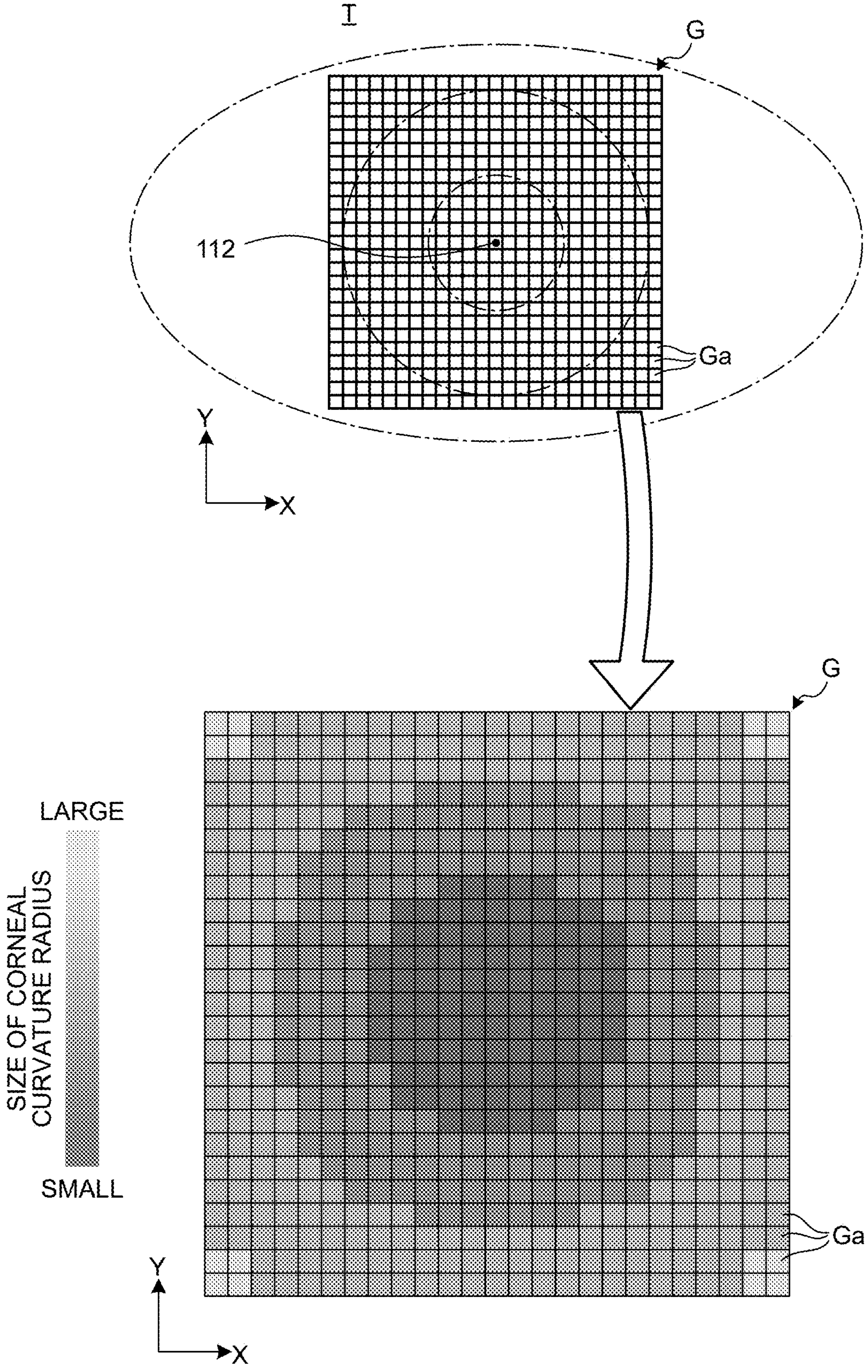
FIG. 3 is a schematic diagram illustrating an example of a curvature radius table used in the present embodiment.

FIG. 3 is a schematic diagram illustrating an example of a curvature radius table used in the present embodiment. As illustrated in FIG. 3, in a curvature radius table T, a grid G having the position of a pupil center 112 as a center thereof is set when the eyeball of the subject is viewed from the front. The grid G is formed in a lattice shape by virtual straight lines. The grid G can have, for example, a horizontal direction as the X direction and a vertical direction as the Y direction. In the curvature radius table T, the position on the cornea is defined by a portion Ga partitioned in a lattice shape by the virtual straight line constituting the grid G. One position on the corneal is defined for each portion Ga. Each portion Ga can be defined by, for example, an X coordinate and a Y coordinate. The curvature radius table T is generated for each subject.

A grid G is illustrated in an enlarged manner in a part of FIG. 3. The curvature radius table T is data in which the calculated corneal curvature radius is associated with each portion Ga partitioned by the grid G. In the grid G of FIG. 3, the same corneal curvature radius is indicated by the same color. In the example illustrated in the enlarged view of the grid G, the corneal curvature radius associated with the portion Ga of the grid G gradually increases as it concentrically spreads around the pupil center 112 of the subject.

The gaze processing unit 34 detects the position of the pupil center of the subject based on the image data imaged by the imaging unit 22. The pupil center is the center of the pupil. The gaze processing unit 34 detects a gaze vector of the eyeball EB of the subject as a gaze based on the calculated position of the pupil center, the position of the light source unit 21, the position of the corneal reflection center, which is calculated by the position detection unit 32, and a value of the corneal curvature radius, which is derived from the curvature radius table T stored in the storage unit 36.

Figure 4:
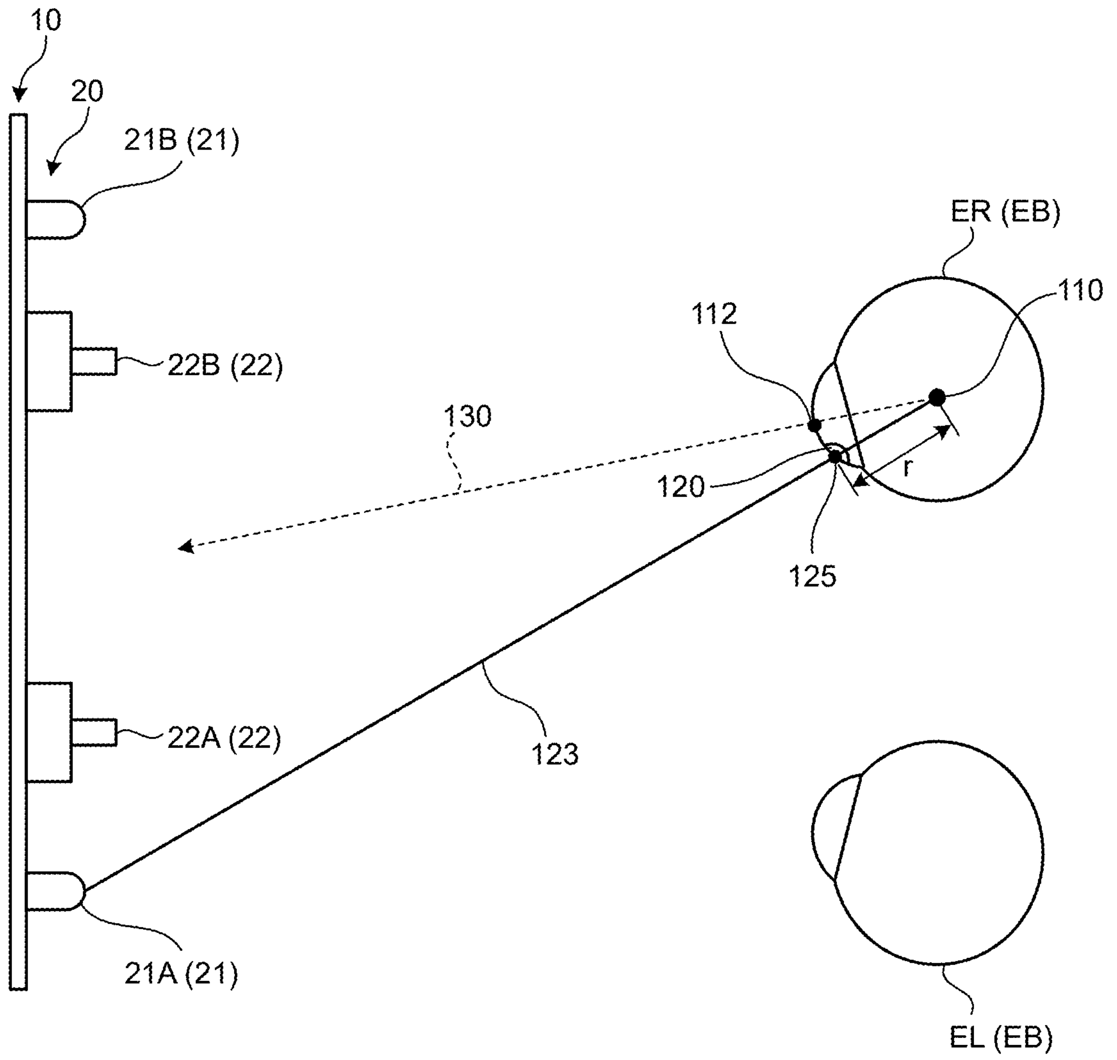
FIG. 4 is a diagram schematically illustrating a principle of detecting a gaze of a subject in the gaze detection device of the present embodiment.

FIG. 4 is a diagram schematically illustrating a principle of detecting the gaze of the subject in the gaze detection device 100 of the present embodiment. Hereinafter, the right eyeball EB (right eye ER) of the subject will be described, but the same description can be made for the left eyeball EB (left eye EL). In the present embodiment, a straight line 130 connecting the pupil center 112 to a corneal curvature center 110 in the eyeball EB of the subject is obtained, and a three-dimensional vector of the straight line 130 is detected as a gaze.

As illustrated in FIG. 4, the eyeball EB of the subject is irradiated with the detection light from one (for example, the first light source 21A) of the first light source 21A and the second light source 21B. A corneal reflection image 120 by the detection light is formed on the cornea of the eyeball EB of the subject. Image data of the eyeball EB on which the corneal reflection image 120 is formed can be acquired by imaging the eyeball EB of the subject with the imaging unit 22. The image data also includes an image of the pupil of the subject. Therefore, the position of the pupil center 112 and the position of a corneal reflection center 125 of the eyeball EB of the subject can be calculated based on the image data. The pupil center 112 indicates the center of the pupil of the subject. The corneal reflection center 125 indicates the center of the corneal reflection image 120. At this time, by using two cameras of the first camera 22A and the second camera 22B, the positions of the pupil center 112 and the corneal reflection center 125 of the subject can be calculated by a triangulation method.

The corneal reflection center 125 is a position on the cornea of the eyeball EB of the subject. In the present embodiment, the curvature radius table T in which the position on the cornea of the eyeball EB of the subject is associated with the value of the corneal curvature radius at the position on the cornea is stored in the storage unit 36. Therefore, by determining the position of the corneal reflection center 125, the value of the corneal curvature radius at the position of the corneal reflection center 125 is derived using the curvature radius table T.

In the eyeball EB of the subject, the corneal curvature center 110 is a position on a straight line 123 connecting the first light source 21A, which is the light source that formed the corneal reflection image 120, to the corneal reflection center 125 of the corneal reflection image 120. Specifically, the position of the corneal curvature center 110 is a position separated from the corneal reflection center 125 by a distance corresponding to the corneal curvature radius in the direction opposite to the first light source 21A on the straight line 123.

The straight line 130 passing through the pupil center 112 and the corneal curvature center 110 can be calculated by obtaining the position of the pupil center 112 and the position of the corneal curvature center 110. Then, the three-dimensional vector of the straight line 130 can be calculated as the gaze of the subject. It is noted that, after the gaze vector is detected, the position of a gaze point indicating an intersection of the straight line 130 (gaze vector) and the display unit 11 can be detected.

Referring back to FIG. 2, the table generation unit 35 generates the above-described curvature radius table T. When the eyeball EB is irradiated with the detection light from the two light sources of the first light source 21A and the second light source 21B, the table generation unit 35 calculates the corneal curvature radius of the eyeball of the subject based on a distance between the two corneal reflection centers formed on the cornea of the eyeball EB (hereinafter, referred to as a center-to-center distance) and a camera-to-subject distance (a distance between the imaging unit 22 and the subject), and generates the curvature radius table using the calculated corneal curvature radius.

Figure 5:
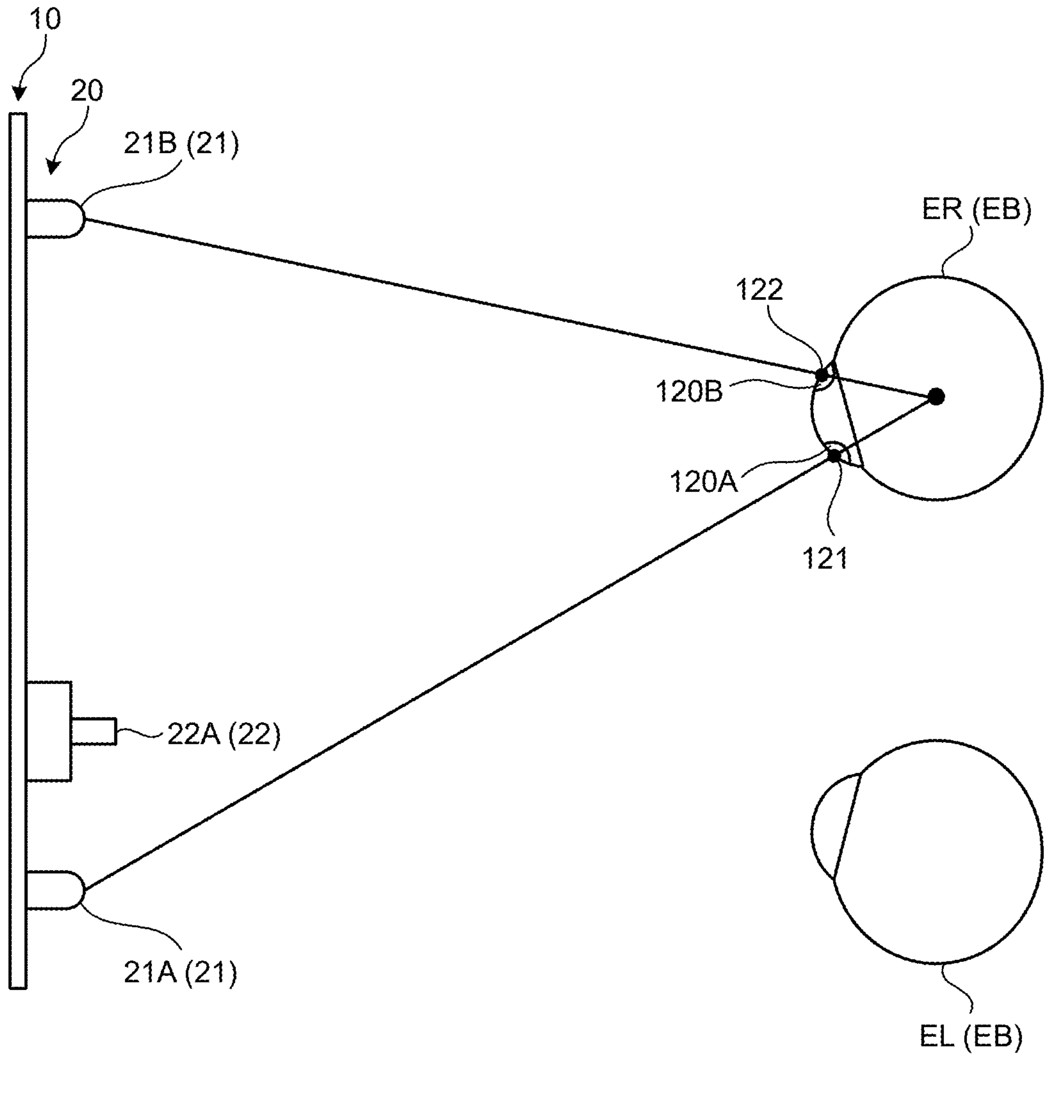
FIG. 5 is a diagram schematically illustrating a state in which an eyeball of the subject is irradiated with detection light from a light source unit.
Figure 6:
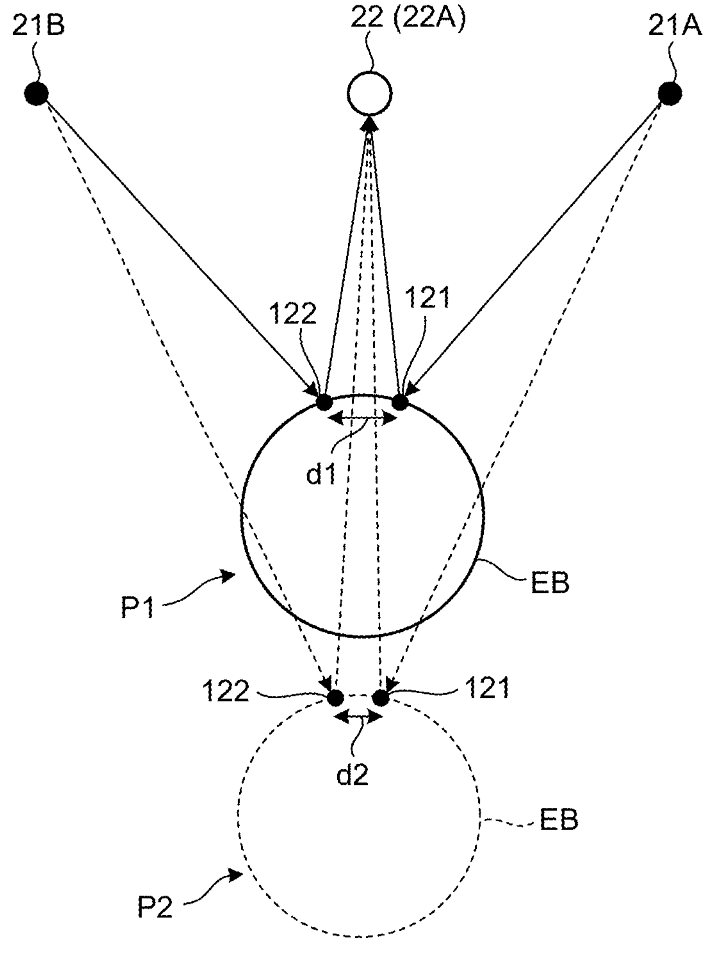
FIG. 6 is a diagram schematically illustrating a state in which the eyeball of the subject is irradiated with the detection light from the light source unit.

Here, the principle of calculating the corneal curvature radius by the table generation unit 35 will be described. FIGS. 5 and 6 are diagrams each schematically illustrating a state in which the eyeball EB of the subject is irradiated with the detection light from the light source unit 21. Hereinafter, the right eyeball EB (right eye ER) of the subject will be described, but the same description can be made for the left eyeball EB (left eye EL). In addition, in FIGS. 5 and 6, only the first camera 22A is illustrated as the imaging unit 22, and the second camera 22B is omitted, but both the first camera 22A and the second camera 22B are actually arranged.

As illustrated in FIGS. 5 and 6, when the eyeball EB is irradiated with the detection light from the first light source 21A and the second light source 21B, a corneal reflection image is formed on the cornea of the eyeball EB. Here, the center of a corneal reflection image 120A of the first light source 21A is a first corneal reflection center 121. The center of the corneal reflection image 120B of a second light source 21B is a second corneal reflection center 122.

As illustrated in FIG. 6, a center-to-center distance d between the first corneal reflection center 121 and the second corneal reflection center 122 changes as a distance between the imaging unit 22 and the subject changes. For example, d1>d2 is established between the center-to-center distance d1 in a case where the camera-to-subject distance, which is a distance between the imaging unit 22 and the eyeball EB of the subject, is x1 (a position P1) and the center-to-center distance d2 in a case where the camera-to-subject distance is x2 which is larger than x1 (a position P2).

Figure 7:
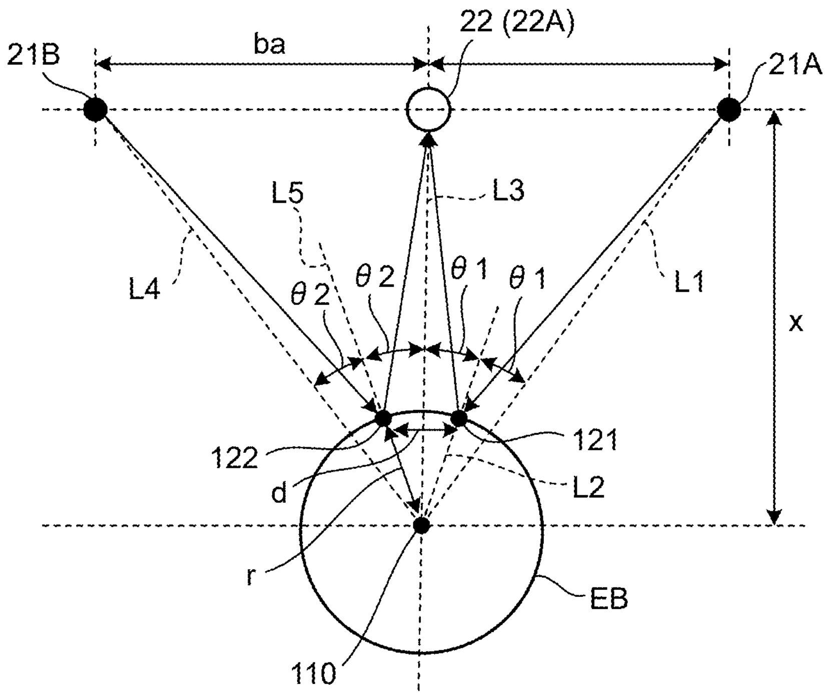
FIG. 7 is a diagram illustrating an example of a positional relationship among the light source unit, an imaging unit, and the eyeball of the subject.

FIG. 7 is a diagram illustrating an example of a positional relationship among the light source unit, the imaging unit, and the eyeball of the subject. As illustrated in FIG. 7, a distance between the first light source 21A and the imaging unit 22 is defined as a, a distance between the second light source 21B and the imaging unit 22 is defined as b, a camera-to-subject distance between the imaging unit 22 and the subject is defined as x, a distance between the first corneal reflection center 121 and the second corneal reflection center 122 detected in the eyeball EB is defined as d, and a corneal curvature radius is defined as r. In this example, the camera-to-subject distance x is a distance between the imaging unit 22 and a corneal curvature center 110 of the eyeball EB of the subject. It is noted that, for example, a value detected by a triangulation method based on image data imaged by two cameras of the first camera 22A and the second camera 22B can be used as the camera-to-subject distance x. Here, due to r<<x, it is possible to approximate that an angle formed by a straight line L1 passing through the corneal curvature center 110 and the first light source 21A and a straight line L2 passing through the corneal curvature center 110 and the first corneal reflection center 121 is equal to an angle formed by a straight line L3 passing through the corneal curvature center 110 and the imaging unit 22 and the straight line L2. Hereinafter, this angle is defined as θ1. Similarly, it is possible to approximate that an angle formed by a straight line L4 passing through the corneal curvature center 110 and the second light source 21B and a straight line L5 passing through the corneal curvature center 110 and the first corneal reflection center 121 is equal to an angle formed by a straight line L3 passing through the corneal curvature center 110 and the imaging unit 22 and the straight line L5. Hereinafter, this angle is defined as θ2.

In this case, the following Equations 1 to 3 are satisfied.

$$\theta 1 = \arctan(a/x)/2 \quad \text{(Equation 1)}$$

$$\theta 2 = \arctan(b/x)/2 \quad \text{(Equation 2)}$$

$$d = r \cdot \sin\theta 1 + r \cdot \sin\theta 2 \quad \text{(Equation 3)}$$

Figure 8:
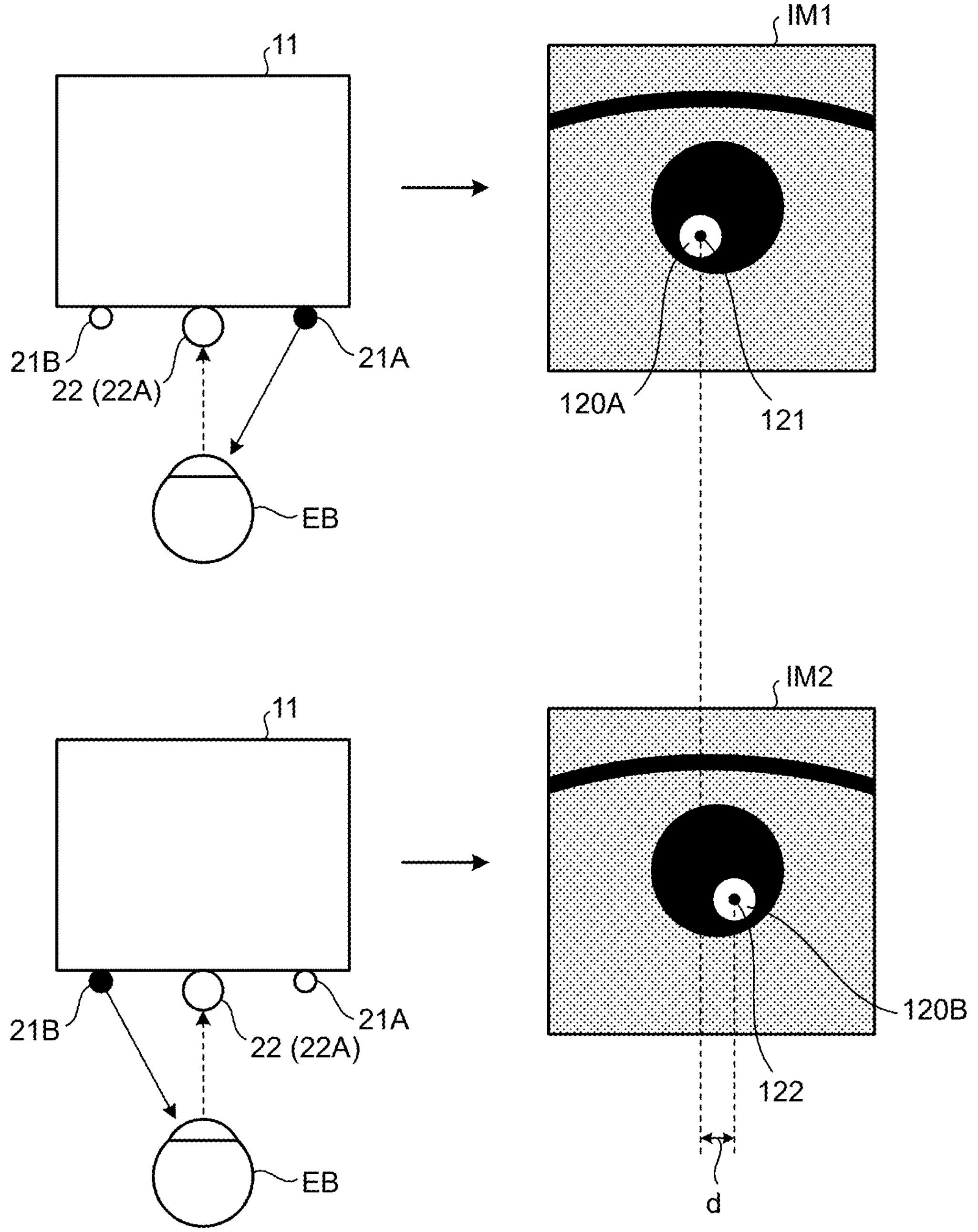
FIG. 8 is a diagram illustrating an example of image data of the eyeball captured by the imaging unit.

FIG. 8 is a diagram illustrating an example of image data of the eyeball EB imaged by the imaging unit 22. As illustrated in FIG. 8, in the present embodiment, image data IM1 obtained when an image is captured in a state in which the eyeball EB is irradiated with detection light from the first light source 21A and image data IM2 obtained when an image is captured in a state in which the eyeball EB is irradiated with detection light from the second light source 21B are acquired as separate image data. In the image data IM1, a corneal reflection image (hereinafter, referred to as a first corneal reflection image 120A) by the detection light from the first light source 21A appears. In the image data IM2, a corneal reflection image (hereinafter, referred to as a second corneal reflection image 120B) by the detection light from the second light source 21B appears. In the present embodiment, the first light source 21A and the second light source 21B are turned on at different timings. For this reason, as the appearance of the first corneal reflection image 120A and the second corneal reflection image 120B, only the first corneal reflection image 120A appears in one image data IM1, and only the second corneal reflection image 120B appears in the other image data IM2. The position detection unit 32 calculates the positions of the first corneal reflection center 121 and the second corneal reflection center 122 based on the acquired first image data and second image data.

The table generation unit 35 calculates an actual distance d (mm) between the first corneal reflection center 121 and the second corneal reflection center 122 from a distance (the number of pixels of the imaging element) d' (pixel) between the first corneal reflection center 121 included in the image data IM1 and the second corneal reflection center 122 included in the image data IM2. It is noted that, in FIG. 8, the positions of the first corneal reflection center 121 and the second corneal reflection center 122 are indicated by black dots in order to facilitate discrimination, but actually, there is no black dot.

Here, when a focal distance of the lens constituting the imaging unit 22 is defined as f, and an inter-pixel distance (pitch) of the imaging element constituting the imaging unit 22 is defined as p, the following Equation 4 is established.

$$d' = (f \cdot d / x) / p \qquad \text{(Equation 4)}$$

When Equations 1 to 4 are solved for d', the following Equation is established.

$$d' = r \cdot (\sin(\arctan(a/x)/2 + \sin(\arctan(b/x)/2)) \cdot f/(p \cdot x) \qquad \text{(Equation 5)}$$

In Equation 5, for example, when a, b=100 (mm), f=12 (mm), x=600 (mm), and p=0.0048 (mm/pixel) are defined, a relational equation between x and d' as in Equation 6 below is obtained.

$$d' = r \cdot (2 \cdot \sin(\arctan(100/600)/2)) \cdot 12/(0.0048 \cdot 600) = r \cdot \alpha \text{ (where } \alpha \text{ is a constant)} \qquad \text{(Equation 6)}$$

The table generation unit 35 can calculate the corneal curvature radius r based on the center-to-center distance d' by using the above Equation 6.

Figure 9:
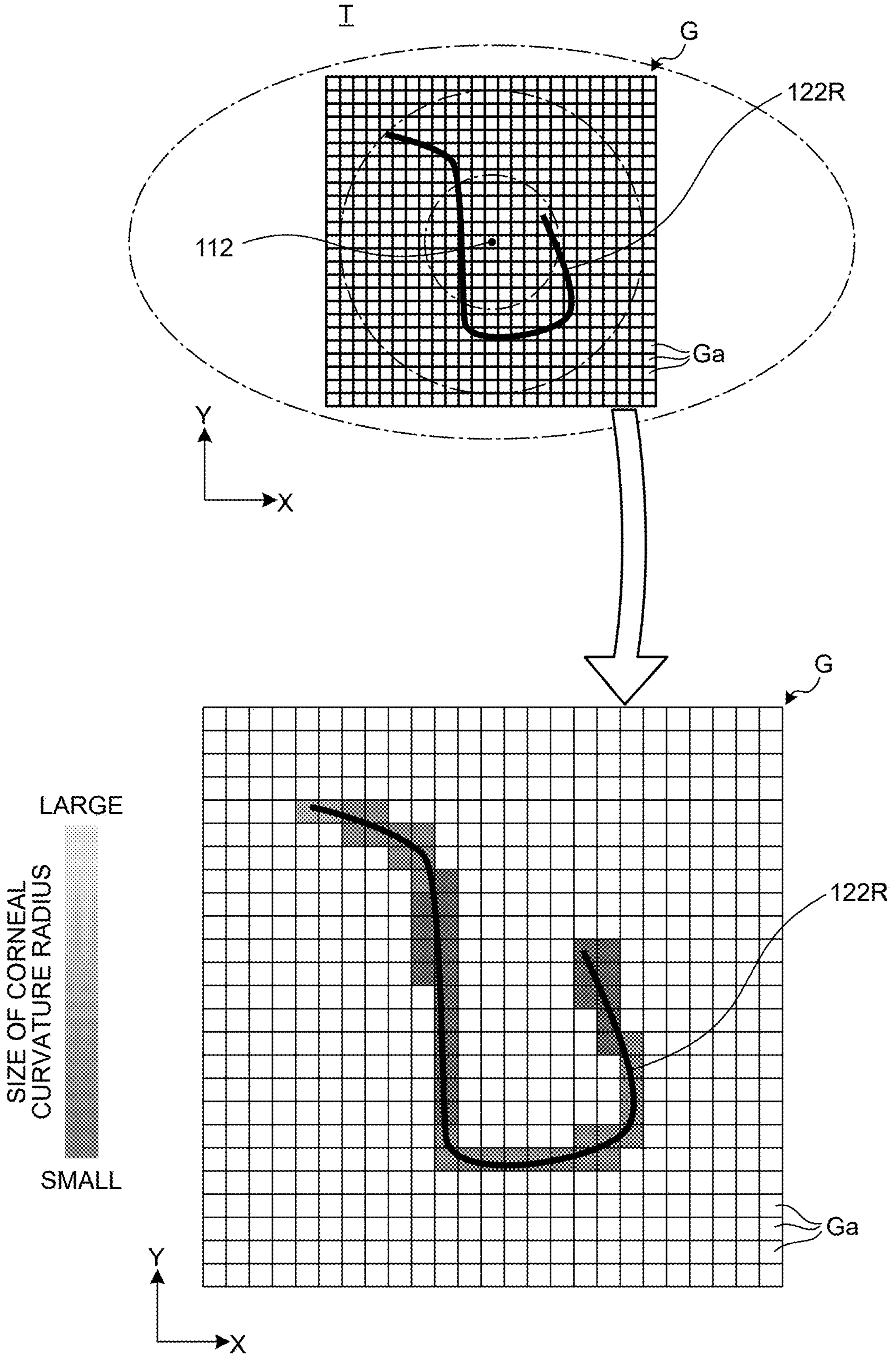
FIG. 9 is a diagram schematically illustrating an example of a process of generating the curvature radius table.

FIG. 9 is a diagram schematically illustrating an example of a process of generating the curvature radius table T. As illustrated in FIG. 9, when the gaze (eyeball EB) moves while the corneal reflection is formed in the eyeball EB of the subject, the positions of the first corneal reflection center 121 and the second corneal reflection center 122 on the cornea relatively move. In FIG. 9, a case in which the position of the second corneal reflection center 122 moves across the portion Ga of the grid G will be described as an example. It is noted that the same description can be made in a case where the position of the first corneal reflection center 121 moves. When the position of the second corneal reflection center 122 on the cornea moves across the portion Ga of the grid G on a trajectory 122R illustrated in FIG. 9, the table generation unit 35 calculates a value of the corneal curvature radius for each portion Ga, and stores the calculated value in association with the portion Ga. It is noted that, when the value of the corneal curvature radius is calculated a plurality of times in the same portion Ga, the table generation unit 35 may associate an average value of the calculation results of the plurality of times as a value of the corneal curvature radius. In this manner, the table generation unit 35 can update the generated curvature radius table T. The table generation unit 35 can generate the curvature radius table T illustrated in FIG. 3, for example, by performing the above processing for a predetermined time.

Figure 10:
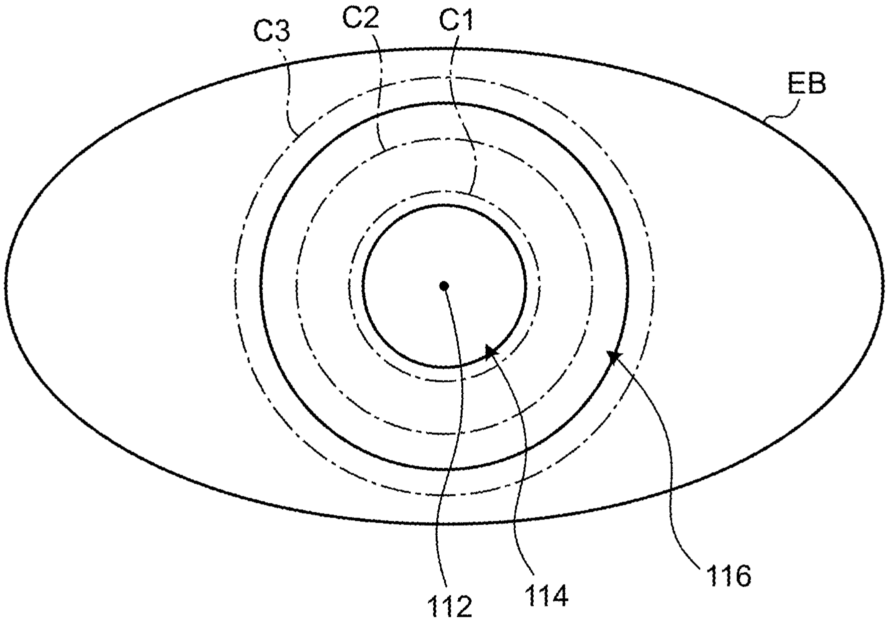
FIG. 10 is a diagram schematically illustrating an example of the eyeball viewed from the front.

It is noted that, in the curvature radius table T illustrated in FIG. 3, the corneal curvature radius can be calculated for some portions Ga without following the above procedure. FIG. 10 is a diagram schematically illustrating an example of the eyeball EB viewed from the front. FIG. 10 illustrates approximate circles C1 to C3 indicating the corneal curvature radius at a pupil 114, an iris 116, and the vicinity thereof. As illustrated in FIG. 10, generally, the corneal curvature radius of the human eyeball EB gradually changes concentrically around the pupil center 112 when viewed from the front. That is, the diameter of the approximate circle gradually increases as a distance from the pupil center 112 increases. The corneal curvature radius of the portion along the approximate circle is substantially equal over the entire circumference of the approximate circle. Therefore, the table generation unit 35 can calculate the corneal curvature radius for all the portions Ga by performing interpolation processing on the portions Ga for which the value of the corneal curvature radius has not been calculated in the grid G of the curvature radius table T such that the corneal curvature radius increases concentrically around the pupil center 112 and the corneal curvature radii of the portions Ga along the concentric circle are the same.

Figure 11:
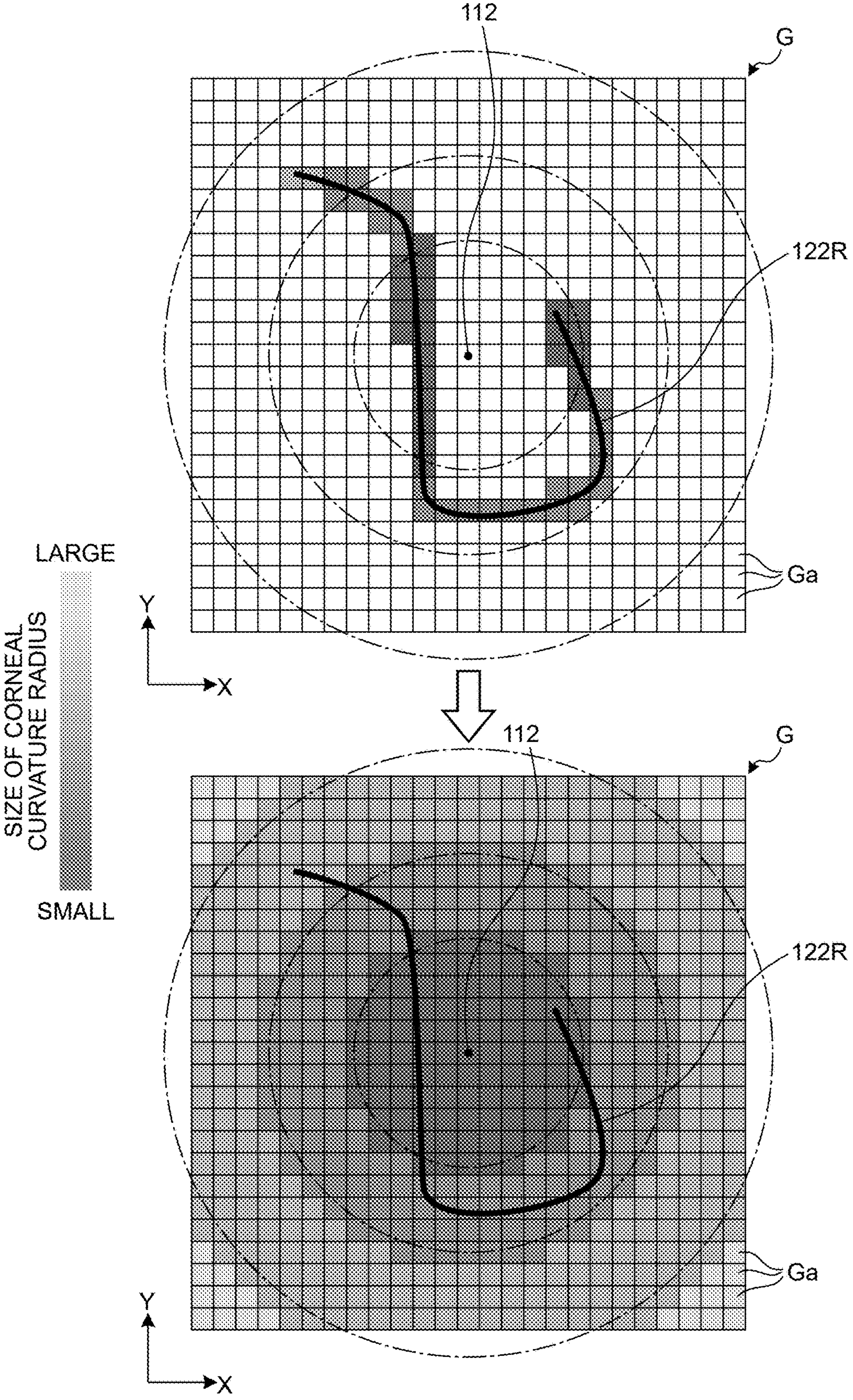
FIG. 11 is a diagram schematically illustrating an example of interpolation processing performed by a table generation unit.

FIG. 11 is a diagram schematically illustrating an example of interpolation processing by the table generation unit 35. As illustrated in FIG. 11, the table generation unit 35 can set a plurality of concentric circles having different diameters, in which each of the concentric circles has the pupil center 112 as a center thereof, in the grid G as the interpolation processing, and interpolate the curvature radius table T such that the corneal curvature radii of the portions Ga existing in the same region have the same value for a plurality of regions partitioned by the plurality of concentric circles. In addition, the table generation unit 35 can interpolate the curvature radius table T such that the value of the corneal curvature radius increases as the diameter of the concentric circle increases. FIG. 11 exemplifies a case in which the table generation unit 35 sets three virtual concentric circles. Hereinafter, a virtual circle having the smallest diameter is defined as a first virtual circle, a virtual circle having the second smallest diameter is defined as a second virtual circle, and a virtual circle having the largest diameter is defined as a third virtual circle. The first virtual circle to the third virtual circle correspond to, for example, the approximate circles C1 to C3 described above. As illustrated in FIG. 11, the table generation unit 35 can interpolate the corneal curvature radii such that the portions Ga located in a region inside the first virtual circle have the same value, the portions Ga located in a region between the first virtual circle and the second virtual circle have the same value, the portions Ga located in a region between the second virtual circle and the third virtual circle have the same value, and the portions Ga located in a region outside the third virtual circle have the same value. Unlike a so-called conventional calibration operation, the generation of the curvature radius table T by the table generation unit 35 can be executed as long as the subject does not need to gaze at a specific position specified in advance and is in a range in which the subject can be imaged by the imaging unit 22.

The storage unit 36 stores various pieces of data and programs for performing processing in each unit of the computer system 30. The storage unit 36 stores, for example, data about an image to be displayed on the display unit 11. The storage unit 36 stores various types of information such as the image data acquired by the imaging control unit 31, the positions of the first corneal reflection center 121 and the second corneal reflection center 122 calculated by the position detection unit 32, and the curvature radius table T in which the corneal curvature radius calculated by the table generation unit 35 is associated with the position on the cornea.

In addition, the storage unit 36 causes a computer to execute processing of emitting detection light from the light source unit 21 and irradiating at least one of the eyeballs EB of a subject with the detection light, processing of capturing an image of the eyeball EB irradiated with the detection light, processing of detecting, from the captured image, the position of the pupil center 112 indicating the center of the pupil of the eyeball EB irradiated with the detection light and the positions of the first corneal reflection center 121 and the second corneal reflection center 122, processing of deriving a corneal curvature radius corresponding to the positions of the detected first corneal reflection center 121 and the second corneal reflection center 122 based on a curvature radius table indicating a relationship between the position on the cornea and the corneal curvature radius, and processing of calculating a gaze of the subject using the detected positions of the first corneal reflection center 121 and the second corneal reflection center 122 and the derived corneal curvature radius, in which, in the processing of calculating the gaze, a gaze detection program causing the computer to execute processing of calculating a straight line connecting the light source unit 21 to the first corneal reflection center 121 and the second corneal reflection center 122, processing of calculating, as the corneal curvature center 110, a position separated from the first corneal reflection center 121 and the second corneal reflection center 122 in a direction opposite to the light source unit 21 by a distance corresponding to the corneal curvature radius on the calculated straight line, and processing of calculating, as the gaze, a gaze vector connecting the corneal curvature center 110 to the pupil center is stored.

Gaze Detection Method

Next, an example of a gaze detection method using the gaze detection device 100 according to the present embodiment will be described. In the gaze detection method according to the present embodiment, as described above, the corneal reflection image is formed on the cornea of the eyeball EB of the subject to obtain the position of a corneal reflection center, and the corneal curvature radius r can be derived using the position of the corneal reflection center and the curvature radius table T stored in advance in the storage unit 36.

Figure 12:
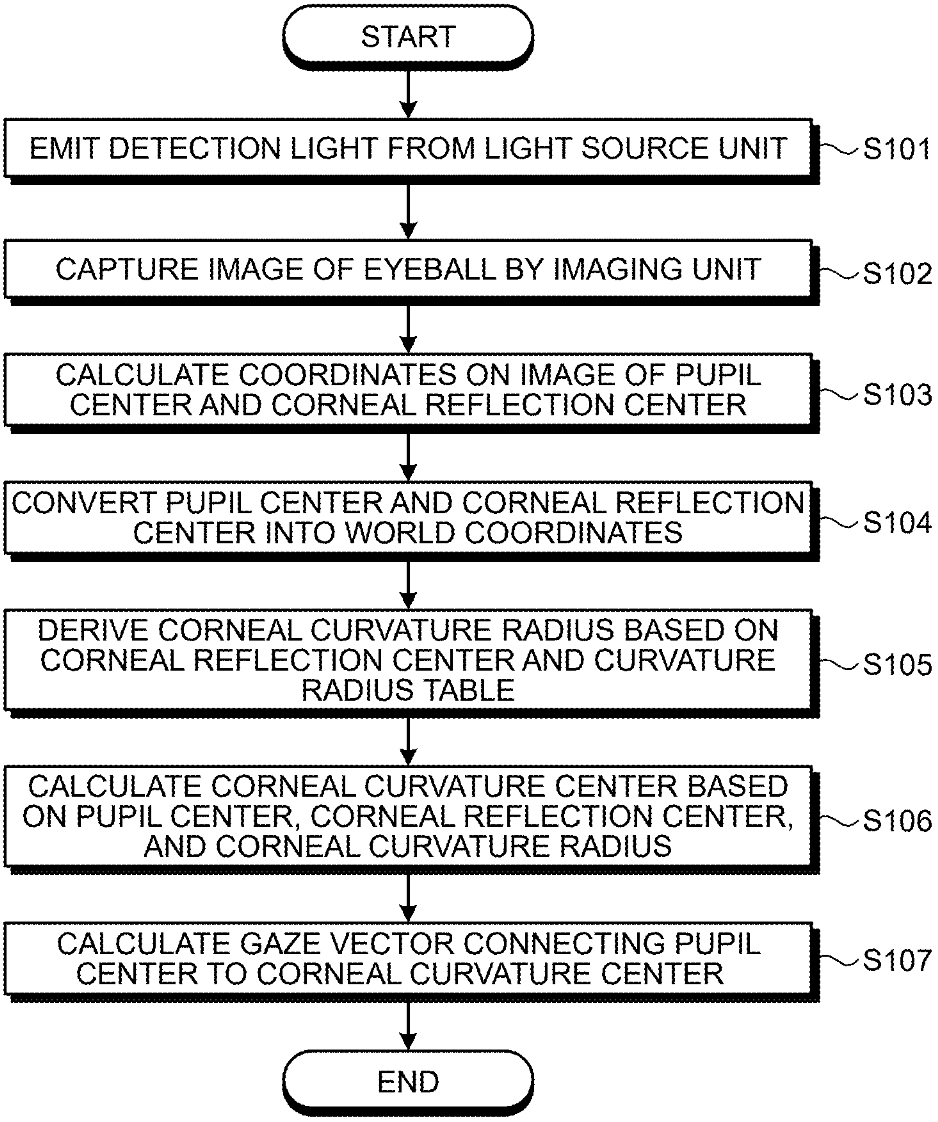
FIG. 12 is a flowchart illustrating an example of gaze detection processing in a gaze detection method according to the present embodiment.

FIG. 12 is a flowchart illustrating an example of gaze detection processing in the gaze detection method according to the present embodiment. As illustrated in FIG. 12, in the gaze detection processing, detection light is emitted from one of the first light source 21A and the second light source 21B of the light source unit 21 to illuminate the eyeball EB (step S101), and the eyeball EB is imaged by both the first camera 22A and the second camera 22B of the imaging unit 22 (step S102). The position detection unit 32 detects the position of the pupil center 112 and the position of the corneal reflection center 125 based on the acquired image data of the eyeball EB (step S103). The position detection unit 32 converts each position of the pupil center 112 and the corneal reflection center 125 into world coordinates (global coordinate system) by a triangulation method or the like (step S104).

The corneal curvature radius derivation unit 33 derives a corneal curvature radius corresponding to the position of the corneal reflection center 125 based on the calculated position of the corneal reflection center 125 and the curvature radius table T (step S105).

The gaze processing unit 34 calculates the position of the corneal curvature center 110 based on the position of the light source that has emitted the detection light among the first light source 21A and the second light source 21B, the position of the pupil center 112, the position of the corneal reflection center 125, and the corneal curvature radius r derived by the corneal curvature radius derivation unit 33 (step S106). In this case, the gaze processing unit 34 obtains the straight line 123 connecting the position of the light source that has emitted the detection light to the corneal reflection center 125. On the obtained straight line 123, the gaze processing unit 34 obtains a position separated from the corneal reflection center 125 by a distance corresponding to the corneal curvature radius r with respect to the inside of the eyeball EB as the position of the corneal curvature center 110.

The gaze processing unit 34 obtains the straight line 130 connecting the pupil center 112 to the corneal curvature center 110, and calculates a three-dimensional vector of the straight line 130 as a gaze vector (step S107).

Next, an example of processing of generating the curvature radius table T in the gaze detection method will be described. The processing of generating the curvature radius table T can be performed, for example, within a predetermined period by setting the predetermined period as calibration processing performed prior to the gaze detection processing. In addition, the processing of generating the curvature radius table T may be performed in addition to a so-called conventional calibration processing of setting a target position, causing the subject to gaze at the set target position, irradiating the eyeball of the subject with detection light from the light source unit 21, imaging the eyeball of the subject by the imaging unit 22, and calculating the corneal curvature radius based on the imaged image data.

Figure 13:
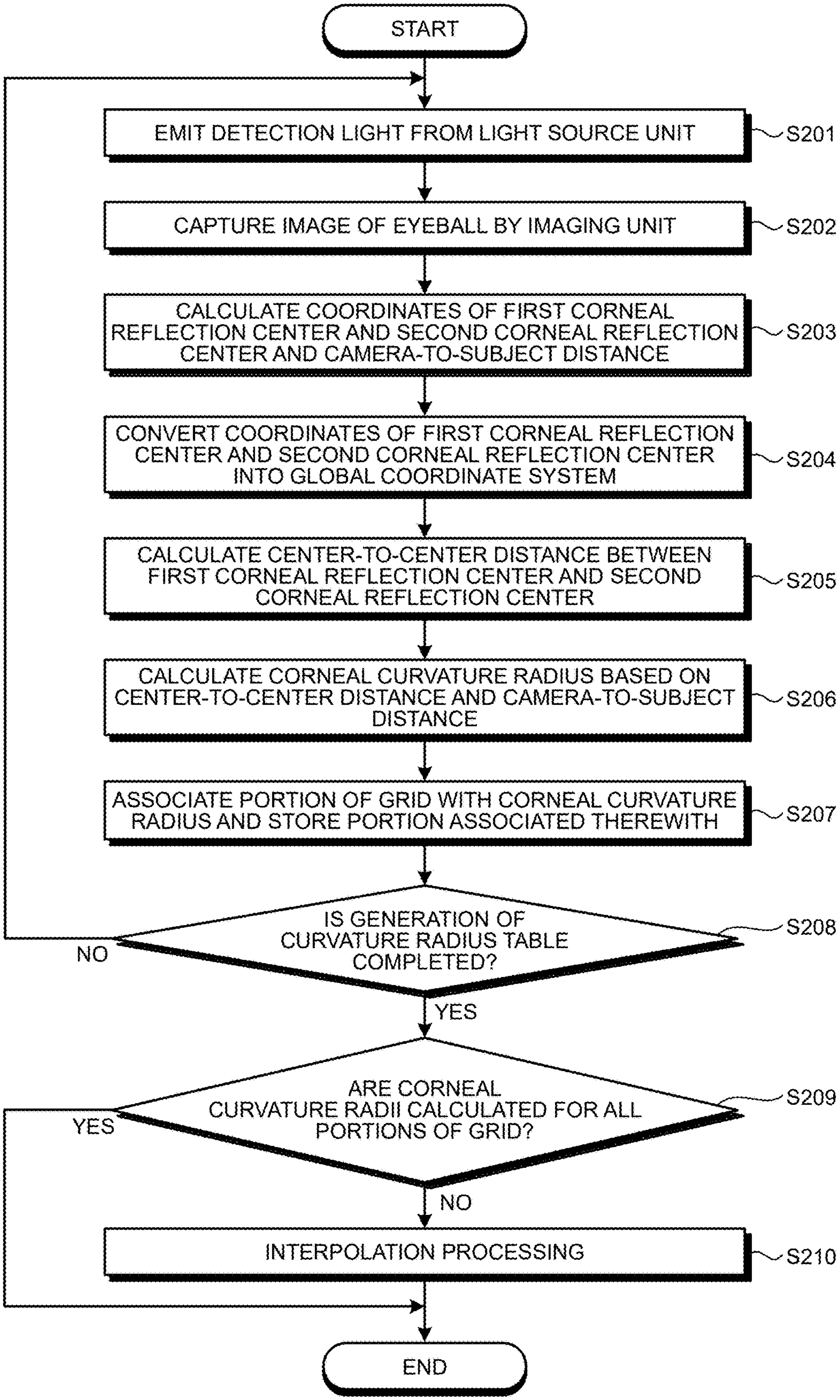
FIG. 13 is a flowchart illustrating an example of processing of generating the curvature radius table.

FIG. 13 is a flowchart illustrating an example of the processing of generating the curvature radius table T. As illustrated in FIG. 13, in the processing of generating the curvature radius table T, unlike the gaze detection processing, for example, detection light is alternately emitted from the first light source 21A and the second light source 21B to illuminate the eyeball EB (step S201), and the eyeball EB is alternately imaged by the second camera 22B and the first camera 22A (step S202). The position detection unit 32 detects the positions of the first corneal reflection center 121 and the second corneal reflection center 122 and the camera-to-subject distance x based on the acquired image data of the eyeball EB (step S203). The position detection unit 32 converts the detected positions of the first corneal reflection center 121 and the second corneal reflection center 122 into the global coordinate system (step S204).

The table generation unit 35 calculates the center-to-center distance d' which is a distance between the first corneal reflection center 121 and the second corneal reflection center 122 (step S205). The table generation unit 35 calculates the corneal curvature radius r based on the calculated center-to-center distance d' and the separately detected camera-to-subject distance x (step S206). The camera-to-subject distance x may be, for example, a value detected in advance by a distance measuring device (not illustrated) or the like as a constant, or may be detected by a distance measuring device or the like at the time of generating the curvature radius table T.

The table generation unit 35 stores the calculated value of the corneal curvature radius in the storage unit 36 in association with the portion Ga corresponding to one or both of the first corneal reflection center 121 and the second corneal reflection center 122 in the grid G constituting the curvature radius table T (step S207).

The table generation unit 35 determines whether the generation of the curvature radius table T has been completed (step S208). In step S208, the table generation unit 35 can determine whether the generation of the curvature radius table T has been completed based on, for example, whether a predetermined period has elapsed.

When it is determined in step S208 that the generation of the curvature radius table T has not been completed (No in step S208), the table generation unit 35 repeats the processing in and after step S201. On the other hand, when it is determined in step S208 that the generation of the curvature radius table T has been completed (Yes in step S208), the table generation unit 35 determines whether the corneal curvature radii are associated with all the portions Ga of the grid G (step S209).

When it is determined in step S209 that the corneal curvature radius is not associated with at least some portions Ga of the grid G (No in step S209), the table generation unit 35 calculates the corneal curvature radius by performing interpolation processing on the portions Ga determined to be not associated with the corneal curvature radius (step S210), and ends the processing. On the other hand, when it is determined in step S209 that the corneal curvature radii are associated with all the portions Ga of the grid G (Yes in step S209), the table generation unit 35 skips step S210 and ends the processing.

As described above, the gaze detection device 100 according to the present embodiment includes the light source unit 21 that emits detection light to irradiate at least one eyeball of a subject with the detection light, the imaging unit 22 that captures an image of the eyeball irradiated with the detection light, the position detection unit 32 that detects, from the captured image, a position of a pupil center indicating a center of a pupil of the eyeball irradiated with the detection light and a position of a corneal reflection center indicating a center of corneal reflection, a corneal curvature radius derivation unit 33 that derives, based on the curvature radius table T indicating a relationship between a position on a cornea and a corneal curvature radius, the corneal curvature radius corresponding to the detected position of the corneal reflection center, and the gaze processing unit 34 that calculates a gaze of the subject using the detected position of the corneal reflection center and the derived corneal curvature radius. The gaze processing unit 34 calculates a straight line connecting the light source unit 21 to the corneal reflection center, calculates, as a corneal curvature center, a position separated from the corneal reflection center by a distance corresponding to the corneal curvature radius derived by the corneal curvature radius derivation unit 33 in a direction opposite to the light source unit 21 on the calculated straight line, and calculate a gaze vector connecting the corneal curvature center to the pupil center as the gaze.

A gaze detection method according to the present embodiment includes emitting detection light from a light source unit 21 to irradiate at least one eyeball of a subject with the detection light, capturing an image of the eyeball irradiated with the detection light, detecting, from the captured image, a position of a pupil center indicating a center of a pupil of the eyeball irradiated with the detection light and a position of a corneal reflection center indicating a center of corneal reflection, deriving, based on a curvature radius table T indicating a relationship between a position on a cornea and a corneal curvature radius, the corneal curvature radius corresponding to the detected position of the corneal reflection center, and calculating a gaze of the subject using the detected position of the corneal reflection center and the derived corneal curvature radius, in which the calculation of the gaze includes calculating a straight line connecting the light source unit 21 to the corneal reflection center, calculating, as a corneal curvature center, a position separated from the corneal reflection center by a distance corresponding to the corneal curvature radius in a direction opposite to the light source unit 21 on the calculated straight line, and calculating a gaze vector connecting the corneal curvature center to the pupil center as the gaze.

A gaze detection program causing a computer to execute processing of emitting detection light from a light source unit 21 to irradiate at least one eyeball of a subject with the detection light, processing of capturing an image of the eyeball irradiated with the detection light, processing of detecting, from the captured image, a position of a pupil center indicating a center of a pupil of the eyeball irradiated with the detection light and a position of a corneal reflection center indicating a center of corneal reflection, processing of deriving, based on a curvature radius table T indicating a relationship between a position on a cornea and a corneal curvature radius, the corneal curvature radius corresponding to the detected position of the corneal reflection center, and processing of calculating a gaze of the subject by using the detected position of the corneal reflection center and the derived corneal curvature radius, in which, in the processing of calculating the gaze, the computer executes processing of calculating a straight line connecting the light source unit 21 to the corneal reflection center, processing of calculating, as a corneal curvature center, a position separated from the corneal reflection center by a distance corresponding to the corneal curvature radius in a direction opposite to the light source unit 21 on the calculated straight line, and processing of calculating, as the gaze, a gaze vector connecting the corneal curvature center to the pupil center.

According to this configuration, since the corneal curvature radius according to the position of the corneal reflection center of the eyeball of the subject can be derived, the corneal curvature radius according to the corneal shape of the subject can be accurately obtained. Accordingly, it is possible to suppress deterioration in detection accuracy in gaze detection using the corneal curvature radius.

In the gaze detection device 100 according to the present embodiment, the light source unit 21 includes two light sources of a first light source 21A and a second light source 21B arranged at different positions, and the position detection unit 32 detects the positions of respective corneal reflection centers from two corneal reflections of the eyeball of the subject by the two light sources including the first light source 21A and the second light source 21B, in which the gaze detection device further includes a table generation unit 35 that calculates the corneal curvature radius based on a distance between the two corneal reflection centers detected by the position detection unit 32 and a distance between the imaging unit 22 and the subject, and generates the curvature radius table T using the calculated corneal curvature radius.

According to this configuration, the position of the corneal reflection center can be detected for the two corneal reflections of the eyeball of the subject by the two light sources of the first light source 21A and the second light source 21B, and the corneal curvature radius can be calculated based on the distance between the two corneal reflection centers detected by the position detection unit 32 and the distance between the imaging unit 22 and the subject, thereby making it possible to generate the curvature radius table T with high accuracy. In addition, the curvature radius table T can be generated in calibration processing when the gaze detection is performed.

In the gaze detection device 100 according to the present embodiment, the table generation unit 35 sets, as a position on the cornea, a grid G having a position of the pupil center as a center thereof, generates, as the curvature radius table T, information obtained by associating the calculated corneal curvature radius with portions Ga of the grid G, the portions corresponding to the positions of the two corneal reflection centers, and interpolates the curvature radius table T such that the corneal curvature radii of the portions Ga present along concentric circles each having the portion Ga as a center thereof, which corresponds to the position of the pupil center in the grid G, become the same value.

According to this configuration, since the curvature radius table T can be interpolated such that the corneal curvature radii of the portions Ga along the concentric circles each having the portion Ga as a center thereof, which corresponds to the position of the pupil center in the grid G, have the same value, the curvature radius table T can be accurately generated even when the value of the corneal curvature radius is not detected for a part of the grid G.

The technical scope of the present disclosure is not limited to the above embodiment, and can be appropriately changed without departing from the gist of the present disclosure. For example, in the above-described embodiment, the case in which the first light source 21A and the second light source 21B are turned on at different timings is described as an example, but the present invention is not limited thereto, and the first light source 21A and the second light source 21B may be turned on at the same timing and an image may be captured by the imaging unit 22.

Furthermore, in the above-described embodiment, the configuration in which there are two imaging units 22 has been described as an example, but the present invention is not limited thereto. One or three or more imaging units 22 may be provided.

In addition, in the above-described embodiment, a configuration in which a value of a corneal curvature radius is used as a value corresponding to the portion Ga of the grid G of the curvature radius table T has been described as an example, but the present invention is not limited thereto. For example, a value of curvature may be used as a value corresponding to each portion Ga. In this case, the table generation unit 35 can calculate the corneal curvature radius based on the reciprocal of the curvature.

According to the present disclosure, it is possible to provide a gaze detection device, a gaze detection method, and a gaze detection program capable of suppressing deterioration in detection accuracy in gaze detection using a corneal curvature radius.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gaze detection device comprising:

a first light source and a second light source disposed at different positions, and configured to emit detection light to irradiate an eyeball of a subject with the detection light;

an imaging unit configured to capture an image of the eyeball irradiated with the detection light;

a position detection unit configured to detect, from the image, a position of a pupil center indicating a center of a pupil of the eyeball irradiated with the detection light and positions of a first corneal reflection center and a second corneal reflection center indicating respective centers of two corneal reflections by the first light source and the second light source;

a table generation unit configured to calculate a corneal curvature radius based on a distance between the first corneal reflection center and the second corneal reflection center and a distance between the imaging unit and the subject, and to generate a curvature radius table using the corneal curvature radius, wherein the table generation unit is configured to:

set, as a position on a cornea, a grid having a position of the pupil center as a center thereof, generate, as the curvature radius table, information obtained by associating the corneal curvature radius with portions of the grid, the portions corresponding to the positions of the first corneal reflection center and the second corneal reflection center, and set, in the grid, a plurality of concentric circles having different diameters, each of the concentric circles having the pupil center as a center thereof, and interpolate the curvature radius table such that corneal curvature radii of the portions present in a same region have a same value for a plurality of regions partitioned by the plurality of concentric circles.

2. The gaze detection device according to claim 1, wherein the curvature radius table indicates a relationship between a position on a cornea and a corneal curvature radius, and the gaze detection device further comprises:

a corneal curvature radius derivation unit configured to derive, based on the curvature radius table indicating a relationship between a position on a cornea and a corneal curvature radius, the corneal curvature radius corresponding to the position of the first corneal reflection center or the second corneal reflection center; and a gaze processing unit configured to calculate a gaze of the subject by using the position of the first corneal reflection center or the second corneal reflection center and the corneal curvature radius.

3. A gaze detection method comprising:

emitting detection light from a first light source and a second light source disposed at different positions to irradiate an eyeball of a subject with the detection light;

capturing, by an imaging unit, an image of the eyeball irradiated with the detection light;

detecting, from the image, a position of a pupil center indicating a center of a pupil of the eyeball irradiated with the detection light and positions of a first corneal reflection center and a second corneal reflection center indicating respective centers of two corneal reflections by the first light source and the second light source;

calculating a corneal curvature radius based on a distance between the first corneal reflection center and the second corneal reflection center and a distance between the imaging unit and the subject;

generating a curvature radius table using the corneal curvature radius;

setting, as a position on a cornea, a grid having a position of the pupil center as a center thereof;

generating, as the curvature radius table, information obtained by associating the corneal curvature radius with portions of the grid, the portions corresponding to the positions of the first corneal reflection center and the second corneal reflection center;

setting, in the grid, a plurality of concentric circles having different diameters, each of the concentric circles having the pupil center as a center thereof; and interpolating the curvature radius table such that corneal curvature radii of the portions present in a same region have a same value for a plurality of regions partitioned by the plurality of concentric circles.

4. A non-transitory computer-readable storage medium storing a program causing a computer to execute:

processing of emitting detection light from a first light source and a second light source to irradiate an eyeball of a subject with the detection light;

processing of capturing, by an image unit, an image of the eyeball irradiated with the detection light;

processing of detecting, from the image, a position of a pupil center indicating a center of a pupil of the eyeball irradiated with the detection light and positions of a first corneal reflection center and a second corneal reflection center indicating respective centers of two corneal reflections by the first light source and the second light source;

processing of calculating a corneal curvature radius based on a distance between the first corneal reflection center and the second corneal reflection center and a distance between the imaging unit and the subject;

processing of generating a curvature radius table using the corneal curvature radius;

processing of setting, as a position on a cornea, a grid having a position of the pupil center as a center thereof;

processing of generating, as the curvature radius table, information obtained by associating the corneal curvature radius with portions of the grid, the portions corresponding to the positions of the first corneal reflection center and the second corneal reflection center;

processing of setting, in the grid, a plurality of concentric circles having different diameters, each of the concentric circles having the pupil center as a center thereof; and processing of interpolating the curvature radius table such that corneal curvature radii of the portions present in a same region have a same value for a plurality of regions partitioned by the plurality of concentric circles.

* * * * *